US011082931B2

(12) United States Patent
Osawa et al.

(10) Patent No.: US 11,082,931 B2
(45) Date of Patent: Aug. 3, 2021

(54) TERMINAL AND RADIO COMMUNICATION METHOD USING MULTIPLE WAVEFORMS

(71) Applicant: NTT DOCOMO, INC., Tokyo (JP)

(72) Inventors: Ryosuke Osawa, Tokyo (JP); Hiroki Harada, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/609,121

(22) PCT Filed: May 1, 2017

(86) PCT No.: PCT/JP2017/017205
§ 371 (c)(1),
(2) Date: Oct. 28, 2019

(87) PCT Pub. No.: WO2018/203379
PCT Pub. Date: Nov. 8, 2018

(65) Prior Publication Data
US 2020/0196252 A1  Jun. 18, 2020

(51) Int. Cl.
*H04W 52/36* (2009.01)
(52) U.S. Cl.
CPC .................. *H04W 52/365* (2013.01)
(58) Field of Classification Search
CPC . H04W 52/365; H04W 52/40; H04W 52/346; H04W 52/16; H04W 88/06; H04W 52/146; H04W 52/242; H04W 52/325; H04W 52/367; H04W 72/042; H04L 27/26
USPC ........................................................ 455/522
See application file for complete search history.

(56) References Cited

U.S. PATENT DOCUMENTS

2016/0255594 A1*  9/2016  Vajapeyam .......... H04W 52/346
                                                         455/522

OTHER PUBLICATIONS

International Search Report issued in PCT/JP2017/017025 dated Jul. 25, 2017 (2 pages).
InterDigital Communications; "Power Control for NR"; 3GPP TSG RAN WG1 Meeting #88bis, R1-1705437; Spokane, Washington, USA; Apr. 3-7, 2017 (4 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).

* cited by examiner

Primary Examiner — Shaima Q Aminzay
(74) Attorney, Agent, or Firm — Osha Bergman Watanabe & Burton LLP

(57) ABSTRACT

According to one aspect of the present invention, a user terminal has a transmission section that is capable of transmitting a plurality of waveforms including a first waveform and a second waveform while switching therebetween, wherein the first waveform is based on a first transmission scheme and the second waveform is based on a second transmission scheme, and transmits the first waveform at a given timing, by using a given cell, and a control section that calculates a power headroom for the second waveform, which is one of the plurality of waveforms and which is not transmitted at the given timing. According to one aspect of the present invention, communication can be continued adequately even when communication is performed by using multiple waveforms.

5 Claims, 8 Drawing Sheets

TERMINAL AND RADIO COMMUNICATION METHOD USING MULTIPLE WAVEFORMS

TECHNICAL FIELD

The present invention relates to a user terminal and a radio communication method in next-generation mobile communication systems.

BACKGROUND ART

In the Universal Mobile Telecommunications System (UMTS) network, the specifications of long term evolution (LTE) have been drafted for the purpose of further increasing high speed data rates, providing lower latency and so on (see non-patent literature 1). In addition, LTE-A (LTE advanced and LTE Rel. 10, 11, 12 and 13) has been standardized for the purpose of achieving increased capacity and enhancement beyond LTE (LTE Rel. 8 and 9).

Successor systems of LTE are also under study (for example, referred to as "Future Radio Access (FRA)," "5th generation mobile communication system (5G)," "5G+ (plus)," "New Radio (NR)," "New radio access (NX)," "Future generation radio access (FX)," "LTE Rel. 14 or 15 and later versions," etc.).

In existing LTE systems (for example, LTE Rel. 8 to 13), a base station (eNB (eNode B)) controls the power of a user terminal (UE (User Equipment)) based on a power headroom (also referred to as "PH" and the like) reported from the UE. The UE includes a PH in a power headroom report (PHR) and transmits this.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, NR), research is underway to support waveforms based on 2 types of communication schemes for the uplink. Meanwhile, envisaging NR, research is on-going to support open-loop transmission power control and closed-loop transmission power control for the uplink.

In order to allow a base station to, for example, command UE to switch the waveform to use, control the transmission power after the switching, and so on, this base station needs to recognize what the PH will be when each waveform is used. However, PHR to assume multiple waveforms has not been studied so far, and, for example, it is not clear how to calculate the PH of a waveform that is not currently in use.

Unless the method for calculating the PH of each waveform is specified, for example, when switching a waveform, it is not possible to control the transmission power to appropriate transmission power that fulfills the target received quality (for example, Signal to Interference plus Noise Ratio (SINR)), and problems such as a decline in communication throughput, received quality and the like, and difficulty in continuing communication will arise.

The present invention has been made in view of the above, and it is therefore an object of the present invention to provide a user terminal and a radio communication method, whereby communication can be continued adequately even when communication is performed by using multiple waveforms.

Solution to Problem

According to one aspect of the present invention, a user terminal has a transmission section that is capable of transmitting a plurality of waveforms including a first waveform and a second waveform while switching therebetween, wherein the first waveform is based on a first transmission scheme and the second waveform is based on a second transmission scheme, and transmits the first waveform at a given timing, by using a given cell, and a control section that calculates a power headroom for the second waveform, which is one of the plurality of waveforms, and which is not transmitted at the given timing.

Advantageous Effects of Invention

According to the present invention, communication can be continued adequately even when communication is performed by using multiple waveforms.

DESCRIPTION OF EMBODIMENTS

Figure 1:
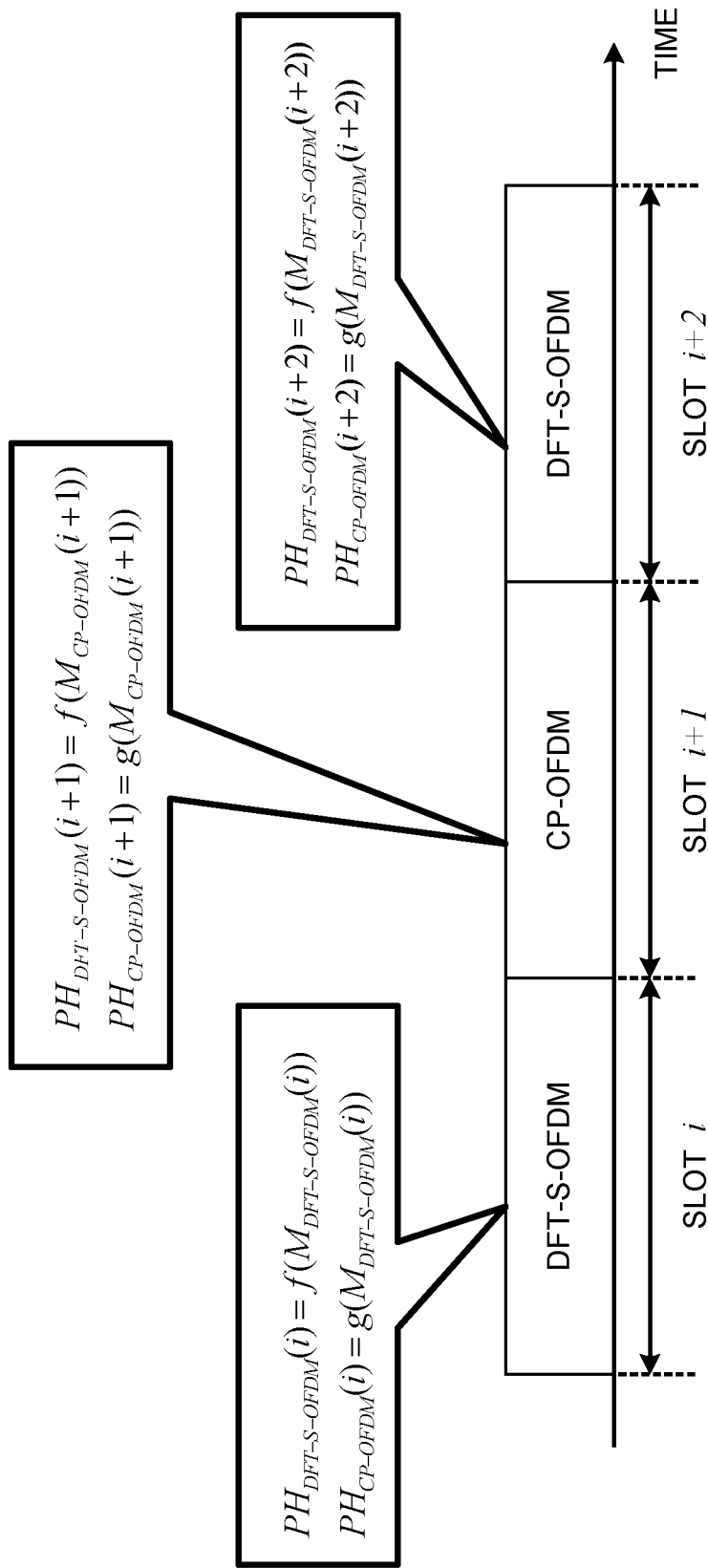
FIG. 1 is a diagram to show examples of PHs reported in a first embodiment of the present invention.

Future radio communication systems (including, for example, NR, which will be hereinafter referred to simply as "NR") are planned to support waveforms that are based on 2 different communication schemes (which may also be referred to as "multiplexing schemes," "modulation schemes," "access schemes," "waveform schemes," etc.), at least for the uplink for use for enhanced Mobile Broad Band (eMBB).

For these 2 types of waveforms, to be more specific, a waveform based on cyclic prefix OFDM (CP-OFDM (Cyclic Prefix Orthogonal Frequency Division Multiplexing)) and a waveform based on DFT-spread OFDM (DFT-S-

OFDM (Discrete Fourier Transform Spread Orthogonal Frequency Division Multiplexing)) are under study.

Note that waveforms may be characterized based on whether or not DFT precoding (spreading) is applied to the OFDM waveform. For example, CP-OFDM may be referred to as a "waveform (signal) to which DFT precoding is not applied," and DFT-S-OFDM may be referred to as a "waveform (signal) to which DFT precoding is applied."

NR might use CP-OFDM and DFT-S-OFDM while switching therebetween, so that the waveform might even alter while communication is in progress. For example, the network (which may be also referred to as, for example, a "base station (BS)," a "transmission/reception point (TRP)," an "eNB (eNodeB)," a "gNB," etc.) may indicate, to UE, which of the CP-OFDM-based waveform and the DFT-S-OFDM-based waveform should be used (or command the UE to switch the waveform).

This indication may be sent to the UE by using higher layer signaling, physical layer signaling (for example, downlink control information (DCI)), or a combination of these. As for the higher layer signaling, for example, Radio Resource Control (RRC) signaling, Medium Access Control (MAC) signaling (for example, MAC control element (MAC CE (Control Element))), broadcast information (for example, the Master Information Block (MIB), System Information Blocks (SIBs), etc.) and the like may be used.

Now, in the uplink of existing LTE (for example, LTE Rel. 13), where DFT-S-OFDM is used, open-loop transmission power control and closed-loop transmission power control are supported. A diagram is shown here, in which an example of transmission power control in existing LTE is shown. In uplink transmission power control in LTE, the error of open-loop control is corrected by closed-loop control, by using TPC commands received from a base station.

For example, in existing LTE, the transmission power $P_{PUSCH,c}(i)$ of an uplink shared channel (Physical Uplink Shared CHannel (PUSCH)) in a subframe i of a serving cell c is represented by equation 1 below:

$$P_{pusch,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} \quad \text{(Equation 1)}$$

In equation 1, $P_{CMAX,c}(i)$ is the maximum power which UE can use in transmission (the maximum possible transmission power), $M_{PUSCH,c}(i)$ is the transmission bandwidth (the number of resource blocks) of the PUSCH, j is an index that shows the type of scheduling that applies to the PUSCH, $P_{O\_PUSCH,c}(j)$ is a value that shows the target received power of the PUSCH or an equivalent, $\alpha_c(j)$ is a coefficient by which $PL_c$ is multiplied, $PL_c$ is the downlink path loss calculated by the UE, $\Delta_{TF,c}(i)$ is an offset value in accordance with the transmission format, and $f_c(i)$ is a correction value based on transmission power control (TPC) commands (for example, the cumulative value of TPC commands, an offset amount based on TPC commands, etc.). For example, $P_{O\_PUSCH,c}(j)$, $\alpha_c(j)$ and/or others may be reported in broadcast information.

In equation 1, $M_{PUSCH,c}(i)$, $P_{O\_PUSCH,c}(j)$, ac(j), $PL_c$ and $\Delta_{TF,c}(i)$ are parameters pertaining to open-loop control. Furthermore, $f_c(i)$ is a parameter that pertains to closed-loop control. That is, the transmission power of the PUSCH is determined based on open-loop control and closed-loop control, with the maximum possible transmission power of the UE as the upper limit.

Note that, although other uplink signals (for example, an uplink control channel (Physical Uplink Control CHannel (PUCCH)), uplink measurement reference signals (Sounding Reference Signals (SRSs), etc.)) use different parameters, the transmission power is determined in the same manner, based on open-loop control, closed-loop control and so forth.

On the other hand, for NR, studies are underway to support open-loop transmission power control and closed-loop transmission power control at least for the uplink for use for eMBB. Here, the transmission power of the CP-OFDM-based waveform on the uplink is likely to be controlled in the form of equation 1 and the like, as with the transmission power control for the DFT-S-OFDM-based waveform.

In existing LTE systems (for example, LTE Rel. 8 to 13), a base station calculates path loss based on power headroom (also referred to as "PH," "UPH (UE Power Headroom)," etc.) reported from UE and selects TPC commands. The UE includes a PH in a power headroom report (PHR) and transmits this.

In NR, in order to allow a gNB to, for example, command UE to switch the waveform to use, control the transmission power after the switching, and so on, this gNB may have to know what the PH will be when each waveform is used. However, PHR to assume multiple waveforms has not been studied so far, and, for example, it is not clear how to calculate the PH of a waveform that is not currently in use.

Unless the method for calculating the PH of each waveform is specified, for example, when switching a waveform, it is not possible to control the transmission power to appropriate transmission power that fulfills the target received quality (for example, Signal to Interference plus Noise Ratio (SINR)), and problems such as a decline in communication throughput, received quality and so forth, will arise.

Therefore, the present inventors have come up with a method for calculating the PH of each waveform when using a number of waveforms while switching therebetween. According to one example of the present invention, even when switching the waveform, it is possible to determine transmission power appropriately and keep communicating adequately.

Now, embodiments of the present invention will be described below in detail with reference to the accompanying drawings. Note that the radio communication methods according to each embodiment may be applied individually or may be applied in combination.

Note that, when hereinafter it is mentioned that a "waveform is switched," this may be interpreted as meaning that a first signal conforming to a waveform based on a first communication scheme (for example, CP-OFDM) or a second signal conforming to a waveform based on a second communication scheme (for example, DFT-S-OFDM) is transmitted using its unique radio resources (for example, time and/or frequency resources)." Furthermore, a "waveform" may also be referred to as "waveform signal," "signal in accordance with waveform," "waveform of signal," and so on.

Also, a waveform in use (or transmitted) at a given timing (for example, at a timing for calculating PH) may be referred to as an "occupied waveform," and a waveform not in use (or not transmitted) at the given timing may be referred to as an "unoccupied waveform."

(Radio Communication Method)

According to one embodiment of the present invention, UE may calculate the PH for an unoccupied waveform as follows:

(1) The UE may determine the value of at least one parameter to use to calculate the PH of an unoccupied waveform based on the value of a parameter that is used to calculate the PH for an occupied waveform, and calculate the PH for the unoccupied waveform;

(2) The UE may calculate the PH for an unoccupied waveform based on configurations defined in the specification;

(3) The UE may calculate the PH for an unoccupied waveform based on a report from a base station.

Referring to the case of (1) above, for example, the UE may calculate the PH of an unoccupied waveform based on the bandwidth allocated to an occupied waveform. For example, when calculating the PH for an unoccupied waveform, the UE may assume that the bandwidth of the unoccupied waveform is the same as the bandwidth allocated to an occupied waveform.

FIG. 1 is a diagram to show examples of PHs reported in the first embodiment. In this example, UE uses DFT-S-OFDM for transmission in slots i and i+2 and uses CP-OFDM for transmission in slot i+1. Note that the waveform may be switched in slot units as shown in the drawing, or may be switched in radio frame units, subframe units, minislot units, etc. Also, as for the unit for the calculation of transmission power represented by equation 1, transmission power may be calculated in slot units, minislot units and so forth, not in subframe units. For example, i in equation 1 may represent a slot. Also, switching of waveforms is not limited to the example shown in FIG. 1.

In FIG. 1, $M_{DFT-S-OFDM}(i)$ and $M_{CP-OFDM}(i)$ represent the transmission bandwidths of the DFT-S-OFDM waveform and the CP-OFDM waveform in slot i, respectively. Also, the PH for the DFT-S-OFDM waveform ($PH_{DFT-S-OFDM}(i)$) and the PH for the CP-OFDM waveform ($PH_{CP-OFDM}(i)$) in slot i are calculated by f(M) and g(M), respectively, which are functions of a predetermined bandwidth M.

The occupied waveform in slot i is the DFT-S-OFDM waveform, and the PH of the DFT-S-OFDM waveform is calculated based on $M_{DFT-S-OFDM}(i)$. Meanwhile, the PH of the CP-OFDM waveform, which is an unoccupied waveform, is also calculated based on $M_{DFT-S-OFDM}(i)$. The same might apply to slot i+2.

In slot i+1, the occupied waveform is the CP-OFDM waveform, and the PH for the CP-OFDM waveform is calculated based on $M_{CP-OFDM}(i+1)$. On the other hand, the PH for the DFT-S-OFDM waveform, which is an unoccupied waveform, is also calculated based on $M_{CP-OFDM}(i+1)$.

In the case of above (2), for example, when calculating the PH for an unoccupied waveform, UE may assume that the bandwidth of this unoccupied waveform is the predetermined bandwidth (for example, 1 PRB) defined in the specification. Also, in this case, the UE may include information, in a PHR, that indicates that the value of the PH of the unoccupied waveform is based on a reference format.

In the case of (3) above, the configuration of at least one parameter value and/or the reference format to use to calculate the PH for the unoccupied waveform is reported (configured) from the base station to the UE. The configuration of this parameter value and/or the reference format may be reported to the UE by higher layer signaling (for example, RRC signaling), physical layer signaling (for example, DCI), or a combination of these.

For example, the UE, when calculating the PH for an unoccupied waveform, may assume that the bandwidth of this unoccupied waveform is a predetermined bandwidth (for example, an arbitrary number of PRBs) reported from the base station. Also, the UE may include, in a PHR, information which shows that the value of the PH of the unoccupied waveform is based on the format (and/or information) configured from the base station, or include, in a PHR, information which shows that the value of the PH of the unoccupied waveform is based on a reference format, as in the above case of (2).

Furthermore, control may be exerted here so that UE may be triggered by receipt of a command to calculate the PH of an unoccupied waveform, calculate the PH of an unoccupied waveform, and report a PHR. This command may be reported by using higher layer signaling (for example, RRC signaling), physical layer signaling (for example, DCI), or a combination of these.

Note that, for the PHR, a PHR, in which only PHs related to occupied waveforms are included, may be used, or a PHR, in which only PHs related to unoccupied waveforms are included, may be used, or a PHR to include both PHs related to occupied waveforms and PHs related to unoccupied waveforms may be used.

Note that, if resources allocated to a waveform are discrete in the frequency direction (that is, a waveform is transmitted using multiple non-contiguous frequency bandwidths), the PH may be calculated for an occupied waveform and/or an unoccupied waveform based on the bandwidths that are actually allocated (that is, the sum of discrete bandwidths). In this case, it is possible to prevent PHs that do not mirror actual conditions from being calculated.

Figure 2:
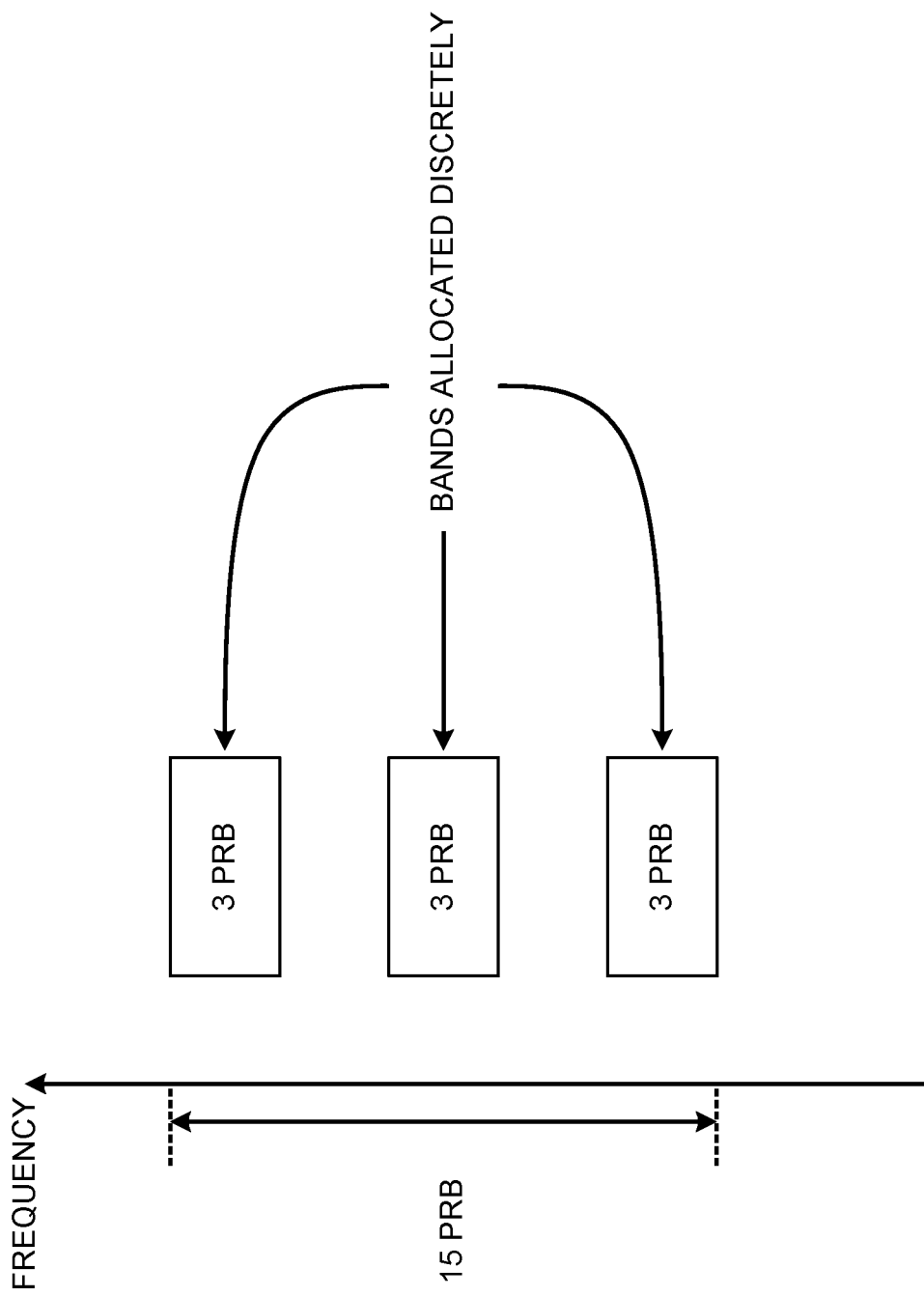
FIG. 2 is a diagram to show examples of bandwidths used for PH calculation when bandwidths are allocated discretely in the frequency direction.

FIG. 2 is a diagram to show examples of bandwidths used for PH calculation when bandwidths are allocated discretely in the frequency direction. FIG. 2 shows an example in which 3 discrete resources (each 3 PRBs wide), 9 PRBs in total, are used as resources for transmitting a waveform. Furthermore, the gap between the upper limit and the lower limit of these resources is, for example, 15 PRBs. In this case, the UE calculates the PH for an occupied waveform and/or an unoccupied waveform based on 9 PRBs, not 15 PRBs.

Note that, when resources are allocated discretely in the frequency direction to an occupied waveform, the UE may calculate the PH for an unoccupied waveform, in above (1), based on the sum of the discrete bandwidths allocated to the occupied waveform.

According to the configuration described above, even when UE switches the transmitting waveform, the base station can learn the PHs of waveforms that are not currently used. By this means, the base station can properly determine whether to switch the waveform, how to control the transmission power after the switch, and so forth.

<PH Offset Reporting>

When reporting the PH of a certain waveform while multiple waveforms are used, instead of reporting this predetermined waveform's PH value on an as-is basis, a gap (offset) that is determined based on the PH of a waveform apart from the predetermined waveform may be reported.

This offset may be transmitted using a PHR MAC CE. That the MAC CE includes this gap may be identified (indicated) by a predetermined field (bit) in the MAC header, or may be identified by the format (for example, the position, order and so forth of the information corresponding to the offset) of the MAC CE.

The format of the MAC CE (for example, whether or not the PH-containing normal PHR MAC CE is used, or an offset-containing MAC CE is used, etc.) may be determined based on UE capabilities (for example, which waveforms are supported). For example, a UE that corresponds to only 1 waveform (and that cannot use multiple waveforms while switching therebetween) may exert control for using a format that does not support offset reporting (that is, a format to report PH values).

Also, information about the MAC CE format to be used may be reported by using higher layer signaling (for example, RRC signaling), physical layer signaling (for example, DCI) or a combination of these.

Also, UE may transmit the above offset by means of signaling (for example, RRC signaling, physical layer signaling (uplink control information (UCI), etc.) other than the above-described MAC CE signaling.

Also, this offset may be defined in the specification based on UE capabilities. In this case, if UE reports the PH of 1 waveform, the offsets of other waveforms with respect to that waveform need not be reported, and the base station can still recognize the PHs of other waveforms.

By using the above offset, the range of values that can be reported as PHs can be expanded beyond the conventional range of values that can be reported as PHs. The PHR MAC CE defined in existing LTE (for example, LTE Rel. 8 to 13) can represent −23 dB to +40 dB. For example, if −31 dB to +32 dB can be represented as offsets, the PH+gap makes it possible to represent −54 dB to +72 dB. In this way, it will be possible to report a wide range of values, so that the transmission power of UE can be controlled even more flexibly.

The number of bits for representing an offset may be smaller than the number of bits for representing a PH used in existing LTE. According to this configuration, the amount of information required to report offsets can be reduced.

Note that an offset as used in the above description may be interpreted as meaning a "transmission power value." Reporting of transmission power values makes it is possible to report transmission power in a flexible manner.

<Reporting of PH Shared by Multiple Cells>

When transmission power is shared among multiple cells, UE may calculate the PH per cell, or calculate the PH based on the sum of the powers of multiple cells that share power. Compared to the case in which individual PHs are reported, by reporting a shared PH, it is expected that the PHR overhead will be reduced. Note that a "cell" here may be interpreted as meaning a "carrier," a "component carrier," a "beam," and so forth.

Here, information about multiple cells that share transmission power may be reported to the UE by using higher layer signaling (for example, RRC signaling, broadcast information (SIBs, for example)), physical layer signaling (for example, DCI) or a combination of these. based on this information, the UE can determine in which cell the transmission power should be shared, which cell's PH should be calculated based on the total power, and so on.

If the UE calculates and reports a PH based on the sum of the powers of multiple cells sharing power, the UE may report information about multiple corresponding cells (multiple cells used to calculate the PH) to the base station by using higher layer signaling (for example, RRC signaling, MAC header, MAC CE, etc.), physical layer signaling (for example, UCI), or a combination of these.

Note that a PH that is calculated based on the sum of the powers of multiple cells that share power may be a PH to assume that a predetermined waveform (for example, UCI) is used in these cells, or may be a PH to assume that different waveforms are used in these cells.

(Variations)

A PHR to include a PH for an unoccupied waveform, a PHR to include an offset with respect to another waveform's PH, and a PHR to include information related to multiple cells used to calculate the PH and so forth may include an Logical Channel IDentifier (LCID) value that is different from the LCID value corresponding to the PHR specified in existing LTE (for example, LTE Rel. 13), in the MAC header.

Note that, in the above embodiment, CP-OFDM and DFT-S-OFDM have been described as examples of waveforms that can be switched during communication, but these are by no means limiting. For example, if at least two of a waveform based on a multicarrier communication scheme, a waveform based on a single carrier communication scheme and other waveforms can be switched and used, the present invention can be applied. Also, even when using a number of waveforms while switching therebetween (for example, multiple waveforms in a single carrier communication scheme) based on the same communication scheme, the present invention can be applied.

Note that, although the above embodiment has been described on the assumption that the transmission power of the PUSCH is subject to control, this is by no means limiting. For example, similar PH reporting may be used for other uplink signals (PUCCH, SRS etc.).

(Radio Communication System)

Now, the structure of a radio communication system according to one embodiment of the present invention will be described below. In this radio communication system, communication is performed using one of the radio communication methods according to the herein-contained embodiments of the present invention, or a combination of these.

Figure 3:
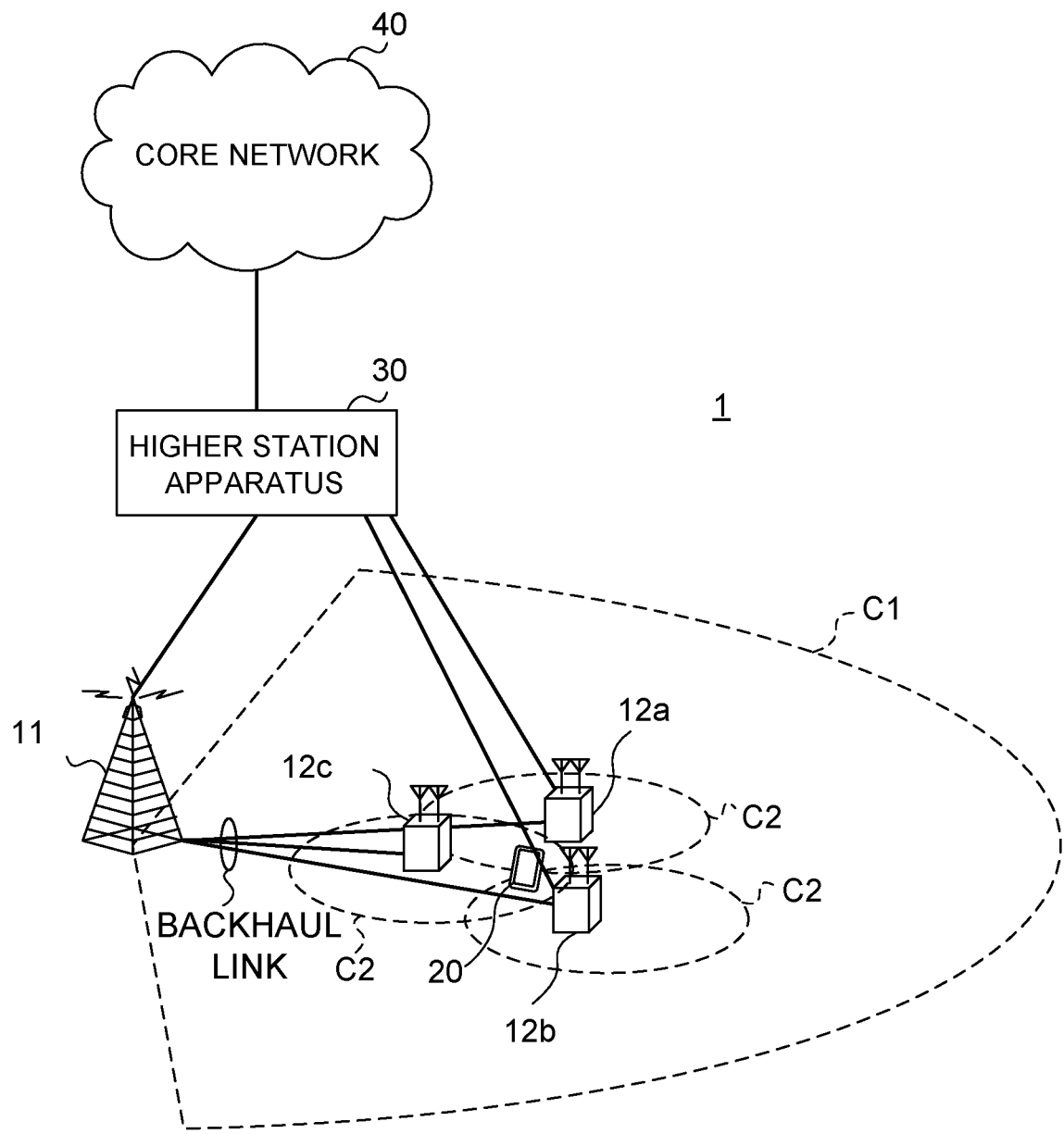
FIG. 3 is a diagram to show an exemplary schematic structure of a radio communication system according to one embodiment of the present invention.

FIG. 3 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "Long Term Evolution (LTE)," "LTE-Advanced (LTE-A)," "LTE-Beyond (LTE-B)," "SUPER 3G," "IMT-Advanced," "4th generation mobile communication system (4G)," "5th generation mobile communication system (5G)," "New Radio (NR)," "Future Radio Access (FRA)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a plurality of different numerologies may be used.

The radio base station 11 and a radio base station 12 (or 2 radio base stations 12) may be connected with each other by cables (for example, by optical fiber, which is in compliance with the Common Public Radio Interface (CPRI), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "Home eNodeBs (HeNBs)," "Remote Radio Heads (RRHs)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used as well.

In the radio communication system 1, a downlink shared channel (Physical Downlink Shared CHannel (PDSCH)), which is used by each user terminal 20 on a shared basis, a broadcast channel (Physical Broadcast CHannel (PBCH)), downlink L1/L2 control channels and so on are used as downlink channels. User data, higher layer control information, System Information Blocks (SIBs) and so on are communicated in the PDSCH. Also, the Master Information Blocks (MIB) is communicated in the PBCH.

The downlink L1/L2 control channels include a Physical Downlink Control CHannel (PDCCH), an Enhanced Physical Downlink Control CHannel (EPDCCH), a Physical Control Format Indicator CHannel (PCFICH), a Physical Hybrid-ARQ Indicator CHannel (PHICH) and so on. Downlink control information (DCI), which includes PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. Hybrid Automatic Repeat reQuest (HARQ) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the downlink shared data CHannel (PDSCH) and used to communicate DCI and so on, like the PDCCH.

In the radio communication system 1, an uplink shared channel (Physical Uplink Shared CHannel (PUSCH)), which is used by each user terminal 20 on a shared basis, an uplink control channel (Physical Uplink Control CHannel (PUCCH)), a random access channel (Physical Random Access CHannel (PRACH)) and so on are used as uplink channels. User data, higher layer control information and so on are communicated by the PUSCH. Also, in the PUCCH, downlink radio quality information (Channel Quality Indicator (CQI)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (Sounding Reference Signals (SRSs)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 4:
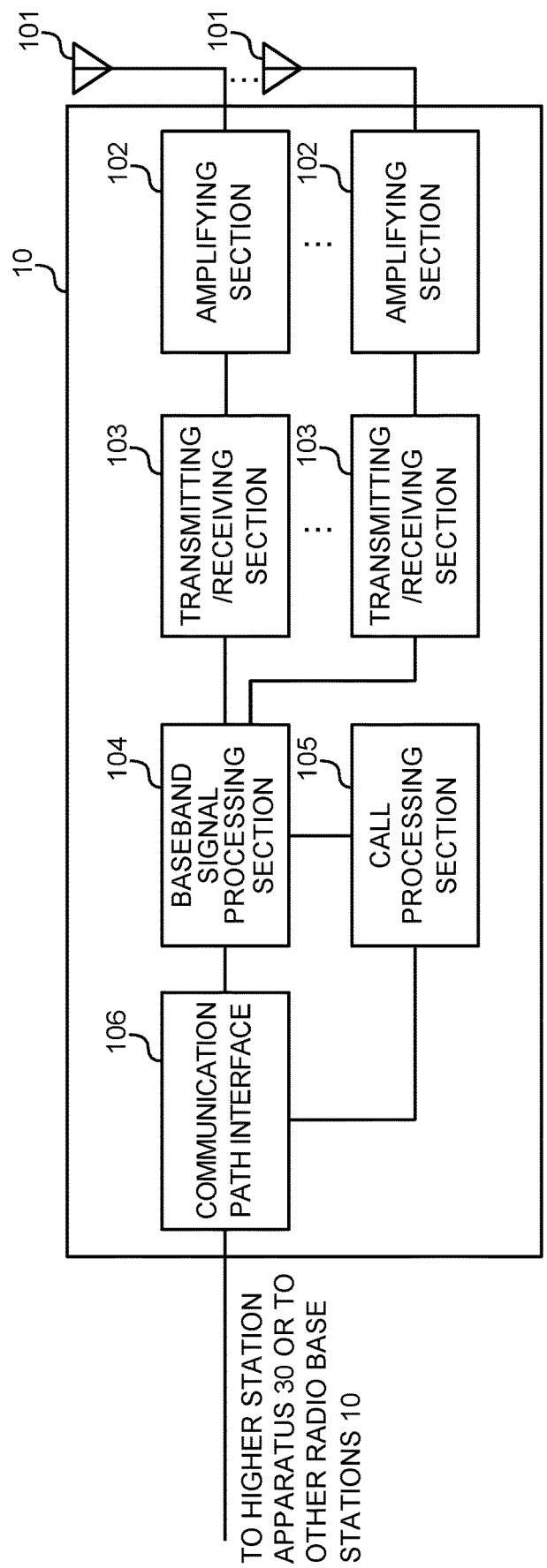
FIG. 4 is a diagram to show an exemplary overall structure of a radio base station according to one embodiment of the present invention.

FIG. 4 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a Packet Data Convergence Protocol (PDCP) layer process, user data division and coupling, Radio Link Control (RLC)

layer transmission processes such as RLC retransmission control, Medium Access Control (MAC) retransmission control (for example, an Hybrid Automatic Repeat reQuest (HARD) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the Common Public Radio Interface (CPRI), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 can receive a plurality of waveforms, including a waveform that is based on a first communication scheme (for example, CP-OFDM) and a waveform that is based on a second communication scheme (for example, DFT-S-OFDM). The transmitting/receiving sections 103 receive the first waveform, which is one of the plurality of waveforms above, at a predetermined timing, by using a predetermined cell.

Also, the transmitting/receiving sections 103 may transmit information (for example, the bandwidth) to use to calculate PH for unoccupied waveforms, information about the MAC CE format to use for PHR, information about multiple cells that share transmission power, and so forth, to the user terminal 20. The transmitting/receiving sections 103 may receive PHR and the like from the user terminal 20.

Figure 5:
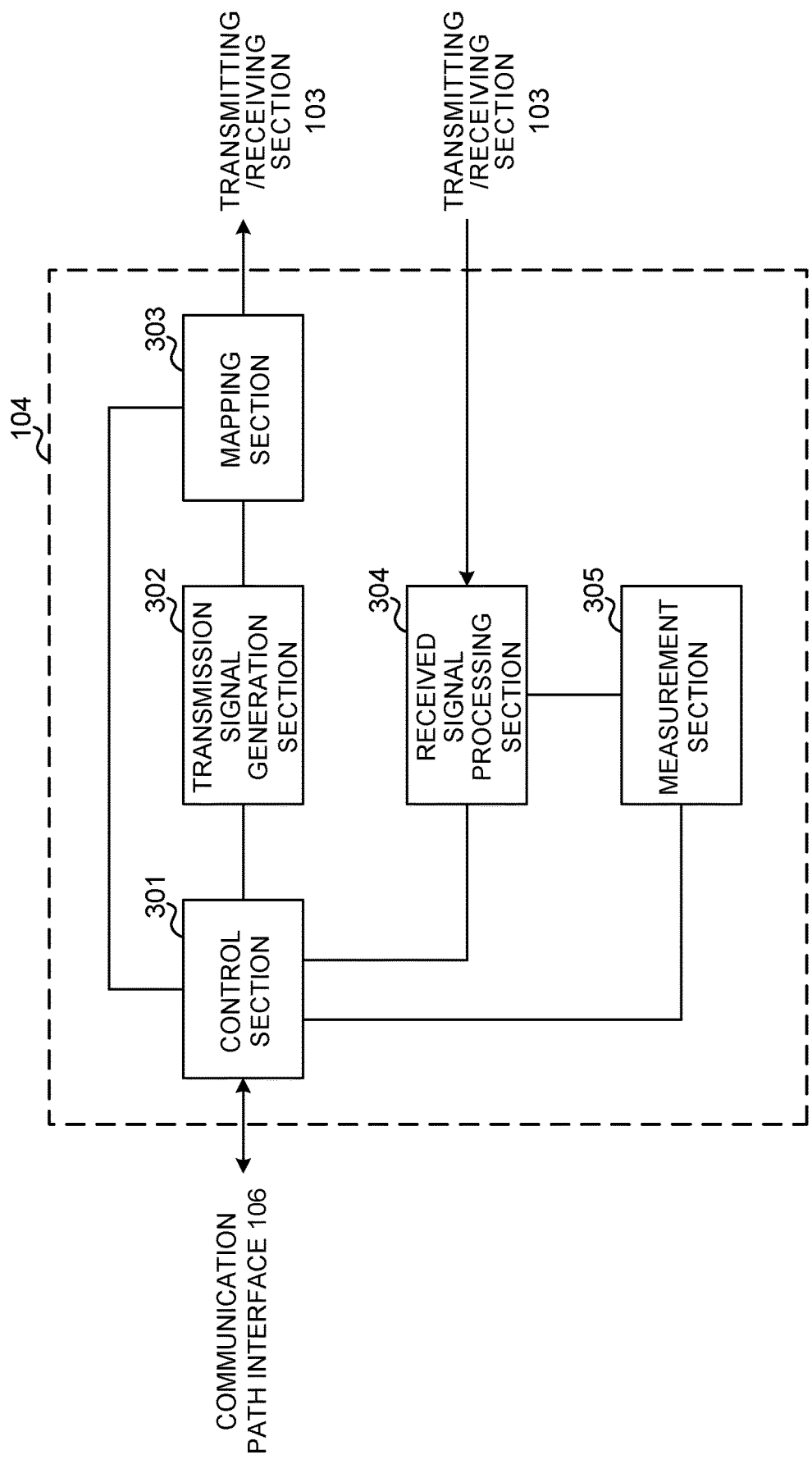
FIG. 5 is a diagram to show an exemplary functional structure of a radio base station according to one embodiment of the present invention.

FIG. 5 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on based on the results of deciding whether or not retransmission control is necessary in response to uplink data signals and so on. Also, the control section 301 controls the scheduling of synchronization signals (for example, Primary Synchronization Signal (PSS)/Secondary Synchronization Signal (SSS)), downlink reference signals (for example, CRSs, CSI-RSs, DMRSs and so on) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 may exert control so that transmitting beams and/or receiving beams are formed by using digital BF (for example, precoding) in the baseband signal processing section 104 and/or analog BF (for example, phase rotation) in the transmitting/receiving sections 103. The control section 301 may exert control so that beams are formed based on downlink propagation path information, uplink propagation path information and so on. These pieces of propagation path information may be obtained from the received signal processing section 304 and/or the measurement section 305.

The control section 301 may exert control so that a first signal conforming to a waveform based on a first communication scheme (for example, CP-OFDM) and a second signal conforming to a waveform based on a second communication scheme (for example, DFT-S-OFDM) are received in different radio resources (for example, time and/or frequency resources). The first signal and the second signal may be signals of the same channel type (for example, PUSCH, PUCCH, etc.), or may be signals (for example, SRS) of the same type.

The control section 301 may exert control so that information (for example, TPC commands) that is used to control the transmission power of signals (for example, the first signal and/or the second signal) that are transmitted from the user terminal 20 is generated and transmitted to the user terminal 20.

The control section 301 may estimate path loss for a predetermined waveform of the user terminal 20 based on a received PHR and/or the like, and select the TPC command to transmit to the user terminal 20 based on this path loss.

For example, the control section 301 may control the power of the user terminal 20 based on the PH of a second waveform, which is one of the above-mentioned plurality of waveforms not transmitted (or not allocated) by the user terminal 20 at a given timing.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform Radio Resource Management (RRM) measurements, Channel State Information (CSI) measurements and so on, based on the received signals. The measurement section 305 may measure the received power (for example, Reference Signal Received Power (RSRP)), the received quality (for example, Reference Signal Received Quality (RSRQ), Signal to Interference plus Noise Ratio (SINR), etc.), Signal to Noise Ratio (SNR), the signal strength (for example, Received Signal Strength Indicator (RSSI)), transmission path information (for example, CSI) and so on. The measurement results may be output to the control section 301.

(User Terminal)

Figure 6:
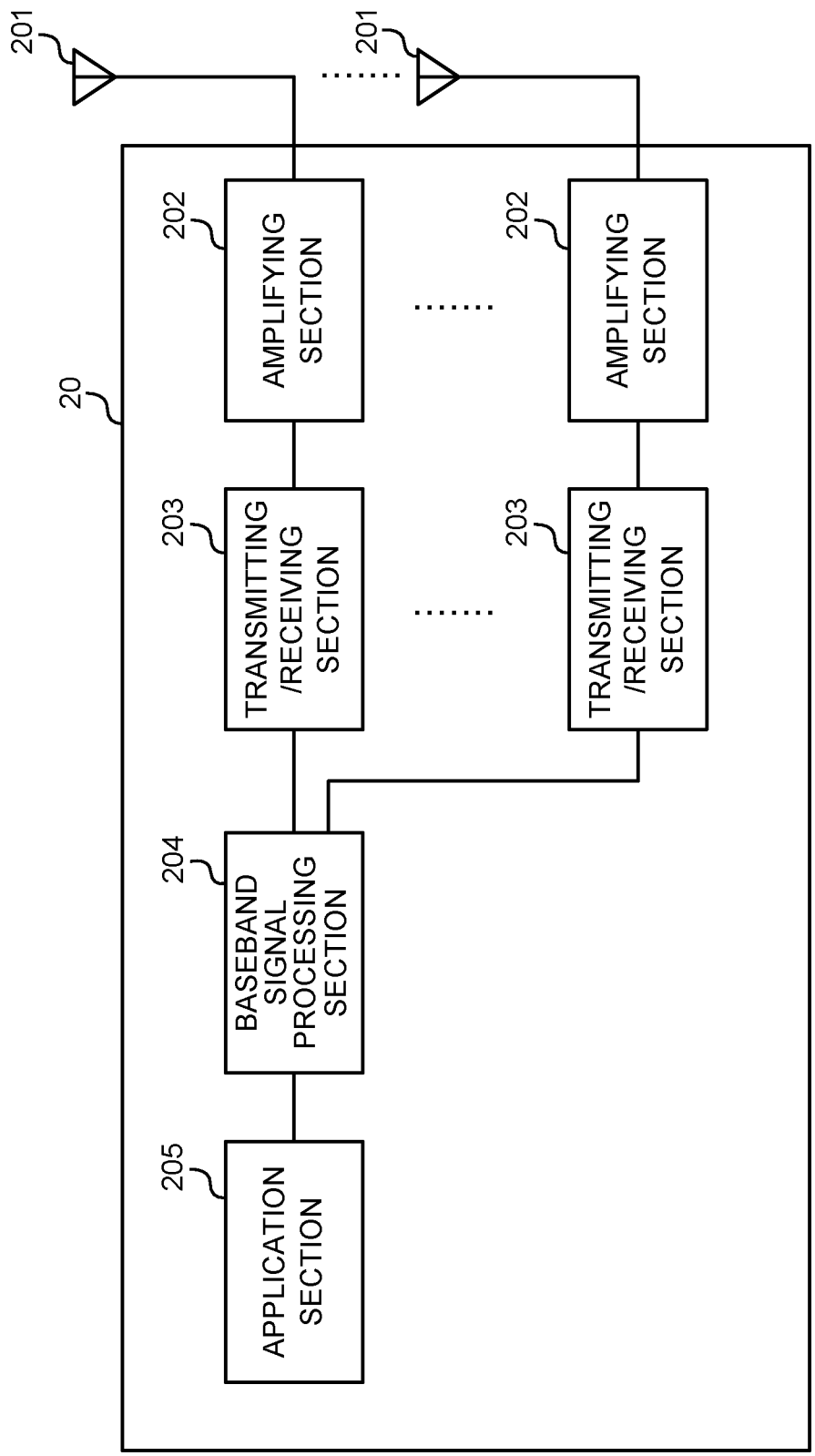
FIG. 6 is a diagram to show an exemplary overall structure of a user terminal according to one embodiment of the present invention.

FIG. 6 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 can transmit a plurality of waveforms including a first waveform and a second waveform while switching therebetween, wherein the first waveform is based on a first transmission scheme (for example, CP-OFDM) and the second waveform is based on a second transmission scheme (for example, DFT-S-OFDM). The transmitting/receiving sections 203 transmit the first waveform, which is one of the plurality of waveforms above, at a given timing, by using a given cell.

Also, the transmitting/receiving sections 203 may receive, from the radio base station 10, information (for example, the bandwidth) to use to calculate PH for unoccupied waveforms, information about the MAC CE format to use for PHR, information about multiple cells that share transmission power, and so forth, to the user terminal 20. The transmitting/receiving sections 203 may transmit a PHR or the like to the radio base station 10.

Figure 7:
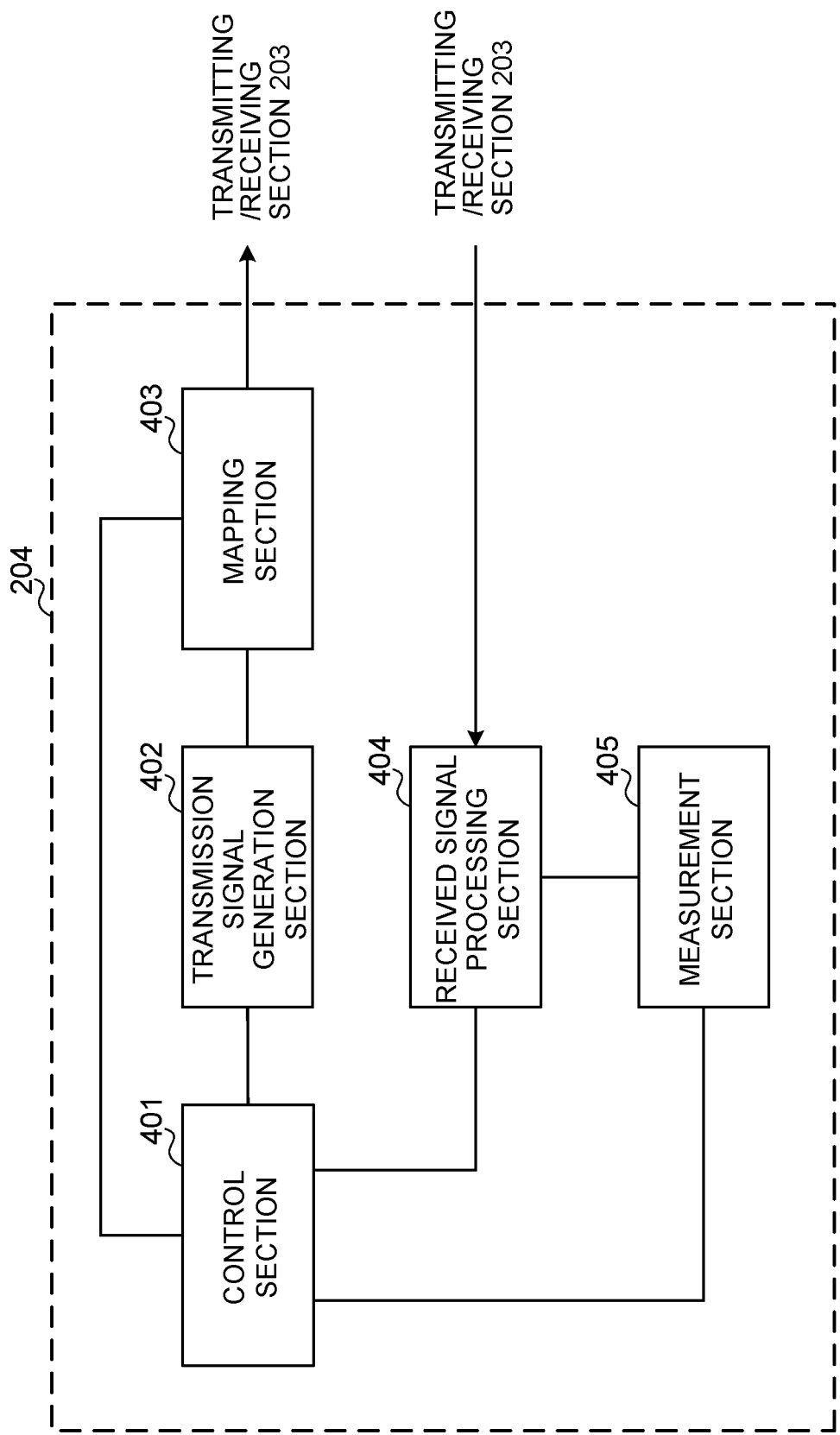
FIG. 7 is a diagram to show an exemplary functional structure of a user terminal according to one embodiment of the present invention.

FIG. 7 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may exert control so that transmitting beams and/or receiving beams are formed by using digital BF (for example, precoding) in the baseband signal processing section 204 and/or analog BF (for example, phase rotation) in the transmitting/receiving sections 203. The control section 401 may exert control so that beams are formed based on downlink propagation path information, uplink propagation path information, and so on. These pieces of propagation path information may be obtained from the received signal processing section 404 and/or the measurement section 405.

The control section 401 may exert control so that a first signal conforming to a waveform based on a first communication scheme (for example, CP-OFDM) and a second signal conforming to a waveform based on a second communication scheme (for example, DFT-S-OFDM) are transmitted in different radio resources (for example, time and/or frequency resources).

The control section 401 may switch between the first signal and the second signal in one or more cells. The control section 401 may control the transmission power of signals that are transmitted (for example, the first signal and/or the second signal). The control section 401 may also exert control so that a PHR to include a calculated PH and/or difference is transmitted.

The control section 401 may also exert control so that the first waveform, which is one of the plurality of waveforms above (for example, CP-OFDM-based waveform, DFT-S-OFDM-based waveform, etc.) is transmitted at a given timing (for example, in a given slot, subframe, etc.), by using a given cell (component carrier, beam, etc.).

The control section 401 may calculate the PH for a second waveform which is one of the plurality of waveforms not transmitted (or not allocated) at the given timing.

The control section 401 may calculate the PH for the second waveform based on the bandwidth allocated to the first waveform that is transmitted at the above given timing.

The control section 401 may calculate the PH of the second waveform based on a predetermined bandwidth configured by the radio base station 10.

When discrete bandwidths are allocated to the first waveform to be transmitted at the above given timing, the control section 401 may calculate the PH for the first waveform and/or the PH for the second waveform based on the sum of the discrete bandwidths.

The control section 401 may calculate the difference between the PH of the second waveform and the PH of the first waveform.

When transmission power is shared among a plurality of cells, the control section 401 may calculate PH based on the total power of the plurality of cells that share power.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by 1 piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 8:
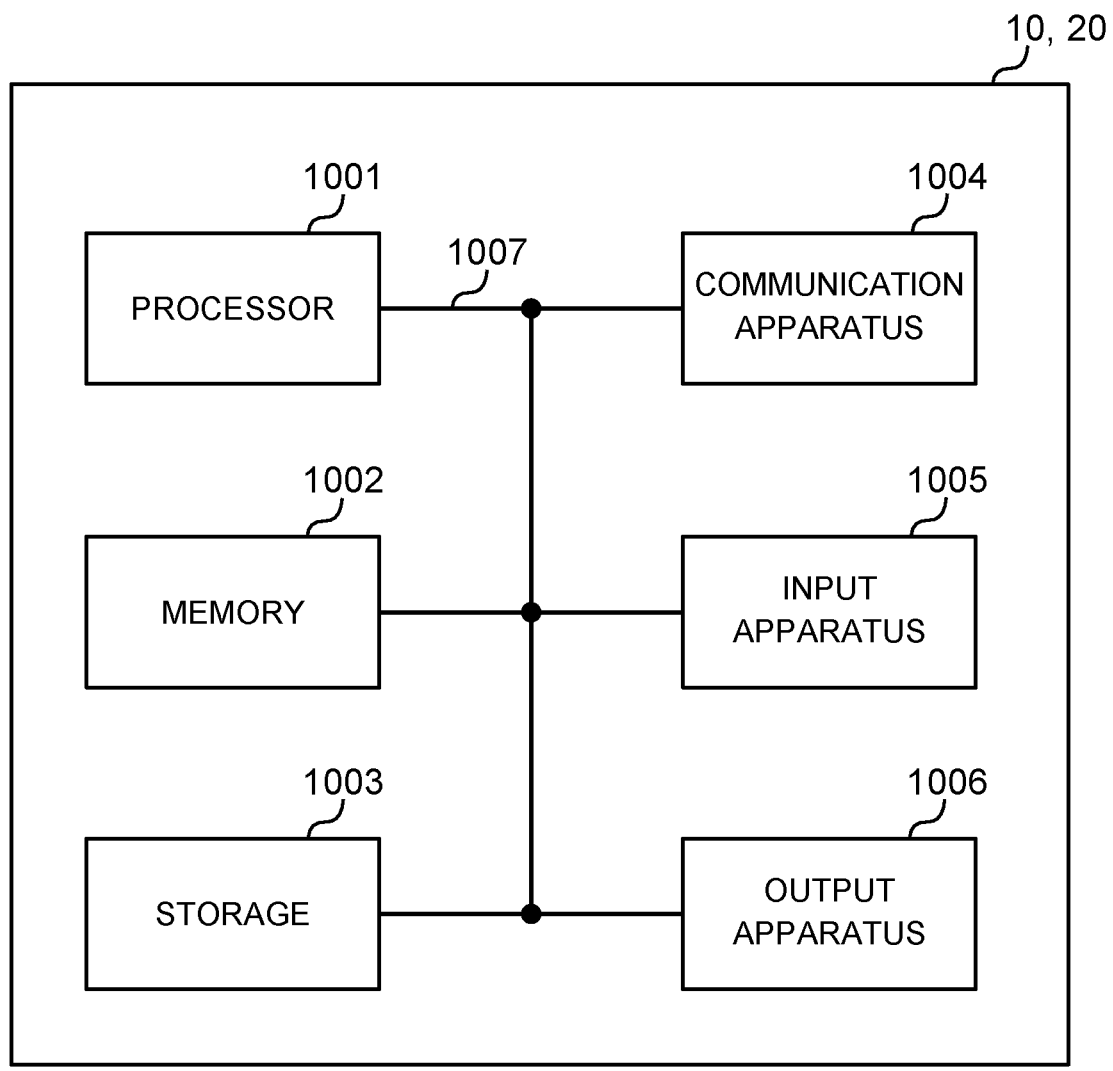
FIG. 8 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 8 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a Read Only Memory (ROM), an Erasable Programmable ROM (EPROM), an Electrically EPROM (EEPROM), a Random Access Memory (RAM) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an Light Emitting Diode (LED) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an Application-Specific Integrated Circuit (ASIC), a Programmable Logic Device (PLD), an Field Programmable Gate Array (FPGA) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (Orthogonal Frequency Division Multiplexing (OFDM) symbols, Single-carrier Frequency Division Multiple Access (SC-FDMA) symbols, and so on). Also, a slot may be a time unit based on numerology. Also, a slot may include a plurality of mini-slots. Each mini-slot may be comprised of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 mini-slot is referred to as a "TTI," one or more TTIs (that is, one or multiple slots or one or more mini-slots) may be the minimum time unit of scheduling. Also, the number of slots (the number of mini-slots) to constitute this minimum time unit of scheduling may be controlled.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 mini-slot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (Physical Uplink Control CHannel (PUCCH), Physical Downlink Control CHannel (PDCCH) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, Radio Resource Control (RRC) signaling, broadcast information (the master information block (MIB), system information blocks (SIBs) and so on), Medium Access Control (MAC) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station,"

"access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (Device-to-Device (D2D)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, Mobility Management Entities (MMEs), Serving-Gateways (S-GWs) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-RAT (Radio Access Technology), New Radio (NR), New radio access (NX), Future generation radio access (FX), GSM (registered trademark) (Global System for Mobile communications), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
    a transmitter that
        is capable of transmitting a first waveform and a second waveform while switching therebetween, wherein the first waveform is based on a first transmission scheme and the second waveform is based on a second transmission scheme, and
        transmits, at a timing, a signal using the first waveform using a cell; and
    a processor that calculates a power headroom for the second waveform that is not used to transmit at the timing, wherein, when discrete bandwidths are allocated to the first waveform that is used to transmit at the timing, the processor calculates a power headroom for the first waveform and/or the power headroom for the second waveform based on a sum of the discrete bandwidths.

2. The terminal according to claim 1, wherein the processor calculates the power headroom for the second waveform based on a given bandwidth that is configured.

3. A radio communication method for a terminal, comprising:
providing capabilities for transmitting a first waveform and a second waveform while switching therebetween, wherein the first waveform is based on a first transmission scheme and the second waveform is based on a second transmission scheme;
transmitting, at a timing, a signal using the first waveform using a cell; and
calculating a power headroom for the second waveform that is not used to transmit at the timing,
wherein when discrete bandwidths are allocated to the first waveform, calculating the power headroom for the first waveform is based on a sum of the discrete bandwidths.

4. A base station comprising:
a receiver that receives a signal, transmitted at a timing using a first waveform using a cell, from a terminal that is capable of transmitting the first waveform and a second waveform while switching therebetween,
wherein the first waveform is based on a first transmission scheme and the second waveform is based on a second transmission scheme; and
a processor that controls to receive a power headroom for the first waveform and/or the power headroom for the second waveform,
wherein, when discrete bandwidths are allocated to the first waveform that is used to transmit at the timing, the processor controls to receive the power headroom for the first waveform and/or the power headroom for the second waveform, calculated based on a sum of the discrete bandwidths.

5. A system comprising a terminal and a base station, wherein:
the terminal comprises:
a transmitter that
is capable of transmitting a first waveform and a second waveform while switching therebetween, wherein the first waveform is based on a first transmission scheme and the second waveform is based on a second transmission scheme, and
transmits, at a timing, a signal using the first waveform using a cell; and
a first processor that calculates a power headroom for the second waveform that is not used to transmit at the timing,
wherein, when discrete bandwidths are allocated to the first waveform that is used to transmit at the timing, the first processor calculates a power headroom for the first waveform and/or the power headroom for the second waveform based on a sum of the discrete bandwidths; and
the base station comprises:
a receiver that receives the signal, using the first waveform, from the terminal; and
a second processor that controls to receive the power headroom for the first waveform and/or the power headroom for the second waveform,
wherein, when discrete bandwidths are allocated to the first waveform that is used to transmit at the timing, the second processor controls to receive the power headroom for the first waveform and/or the power headroom for the second waveform, calculated based on a sum of the discrete bandwidths.

* * * * *